United States Patent
Nasr-El-Din et al.

(10) Patent No.: US 9,745,509 B2
(45) Date of Patent: Aug. 29, 2017

(54) PROCESS TO TREAT SUBTERRANEAN FORMATIONS USING A CHELATING AGENT

(71) Applicant: Akzo Nobel Chemicals International B.V., Amersfoort (NL)

(72) Inventors: Hisham Nasr-El-Din, College Station, TX (US); Cornelia Adriana De Wolf, Eerbeek (NL); Mohammed Ali Ibrahim Sayed, College Station, TX (US); Estevao De Oliveira Barra, Deventer (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/895,134

(22) PCT Filed: Jun. 3, 2014

(86) PCT No.: PCT/EP2014/061445
§ 371 (c)(1),
(2) Date: Dec. 1, 2015

(87) PCT Pub. No.: WO2014/195290
PCT Pub. Date: Dec. 11, 2014

(65) Prior Publication Data
US 2016/0115376 A1    Apr. 28, 2016

Related U.S. Application Data

(60) Provisional application No. 61/830,731, filed on Jun. 4, 2013.

(30) Foreign Application Priority Data

Jun. 27, 2013 (EP) ..................... 13174058

(51) Int. Cl.
| | |
|---|---|
| *C09K 8/86* | (2006.01) |
| *C09K 8/72* | (2006.01) |
| *C09K 8/52* | (2006.01) |
| *C09K 8/528* | (2006.01) |
| *C09K 8/74* | (2006.01) |

(52) U.S. Cl.
CPC ................. *C09K 8/86* (2013.01); *C09K 8/52* (2013.01); *C09K 8/528* (2013.01); *C09K 8/72* (2013.01); *C09K 8/74* (2013.01)

(58) Field of Classification Search
None
See application file for complete search history.

(56) References Cited

U.S. PATENT DOCUMENTS

| | | |
|---|---|---|
| 6,436,880 B1 | 8/2002 | Frenier |
| 6,569,814 B1 | 5/2003 | Brady et al. |
| 6,849,581 B1 | 2/2005 | Thompson et al. |
| 2004/0014606 A1 | 1/2004 | Parlar et al. |
| 2004/0254079 A1 | 12/2004 | Frenier et al. |
| 2006/0073986 A1 | 4/2006 | Jones et al. |
| 2008/0110621 A1 | 5/2008 | Montgomery et al. |
| 2008/0277112 A1 | 11/2008 | Welton et al. |
| 2009/0192057 A1 | 7/2009 | Frenier et al. |
| 2012/0097392 A1* | 4/2012 | Reyes ....................... C02F 5/12 166/279 |
| 2012/0115759 A1 | 5/2012 | Reyes |
| 2012/0202720 A1 | 8/2012 | de Wolf et al. |
| 2012/0279711 A1 | 11/2012 | Collins et al. |

FOREIGN PATENT DOCUMENTS

| | | |
|---|---|---|
| UA | 27046 U | 10/2007 |
| WO | 00/40667 A1 | 7/2000 |
| WO | 01/83639 A2 | 11/2001 |
| WO | 2006/029019 A2 | 3/2006 |
| WO | 2007/020592 A2 | 2/2007 |
| WO | 2010/045343 A2 | 4/2010 |
| WO | 2012/080296 A1 | 6/2012 |
| WO | 2012/080463 A1 | 6/2012 |
| WO | 2012/150435 A1 | 11/2012 |
| WO | 2012/171858 A1 | 12/2012 |
| WO | 2013/160334 A1 | 10/2013 |

OTHER PUBLICATIONS

European Search Report for EP13174058.1, dated Oct. 17, 2013.
International Search Report and Written Opinion for PCT/EP2014/061445, date of mailing Jun. 25, 2014.
Pournik et al., Small-Scale Fracture Conductivity Created by Modern Acid-Fracture Fluids, SPE Hydraulic Fracturing Technology Conference held in College Station, TX, U.S.A., pp. 1-22, Jan. 29-31, 2007, SPE 106272.
Ali et al., Stimulation of High-Temperature Sandstone Formations From West Africa with Chelating Agent-Based Fluids, SPE Production & Operation, pp. 32-38, Feb. 2008 SPE 93805.
Mahmoud et al., Optimum Injection Rate of a New Chelate That Can be used to Stimulate Carbonate Reservoirs, SPE Annual Technical Conference and Exhibition Held in Florence, Italy, pp. 1-22, Sep. 20-22, 2010, SPE133497.
Adenuga, O.O. et al., Reactions of Simple Organic Acids and Chelating Agents with Dolomite, Society of Petroleum Engineers, 2013, pp. 1-15, SPE 164480.

\* cited by examiner

*Primary Examiner* — John J Figueroa
(74) *Attorney, Agent, or Firm* — Sandra B. Weiss

(57) ABSTRACT

The present invention relates to a process to treat a subterranean formation by introducing a composition containing between 1 and 40 wt % on total weight of the composition of a chelating agent selected from the group of glutamic acid N,N-diacetic acid or a salt thereof (GLDA), aspartic acid N,N-diacetic acid or a salt thereof (ASDA), and methylglycine N,N-diacetic acid or a salt thereof (MGDA) into the formation, wherein the process comprises a soaking step.

9 Claims, No Drawings

PROCESS TO TREAT SUBTERRANEAN FORMATIONS USING A CHELATING AGENT

This application is a national stage filing under 35 U.S.C. §371 of PCT/EP2014/061445, filed Jun. 3, 2014, which claims priority to U.S. Provisional Patent Application No. 61/830,731 filed Jun. 4, 2013, and European Patent Application No. 13174058.1, filed Jun. 27, 2013, the contents of which are each incorporated herein by reference in their entireties.

The present invention relates to a process to treat a subterranean formation by introducing into the formation a composition containing between 1 and 40 wt % on total weight of the composition of a chelating agent selected from the group of glutamic acid N,N-diacetic acid or a salt thereof (GLDA), aspartic acid N,N-diacetic acid or a salt thereof (ASDA), and methylglycine N,N-diacetic acid or a salt thereof (MGDA), wherein the process contains a soaking step.

Subterranean formations from which oil and/or gas can be recovered can contain several solid materials contained in porous or fractured rock formations. The naturally occurring hydrocarbons, such as oil and/or gas, are trapped by the overlying rock formations with lower permeability. The reservoirs are found using hydrocarbon exploration methods and often one of the purposes before withdrawing the oil and/or gas therefrom is to improve the permeability of the formations. The rock formations can be distinguished by their major components and one category is formed by so-called sandstone formations, which contain siliceous materials (like quartz) as the major constituent, while another category is formed by so-called carbonate formations, which contain carbonates (like calcite, chalk, and dolomite) as the major constituent. A third category is formed by shales, which contain very fine particles of many different clays covered with organic materials to which gas and/or oil are adsorbed. Shale amongst others contains many clay minerals like kaolinite, illite, chlorite, and montmorillonite, as well as quartz, feldspars, carbonates, pyrite, organic matter, and cherts.

One process to make formations more permeable is a matrix-acidizing process, wherein an acidic fluid is introduced into the formations containing the oil and/or gas.

Acidic treatment fluids are known in the art and are for example disclosed in US 2012202720, which describes compositions for treating a carbonate formation containing GLDA and having a pH of about 3.

However, in a number of instances a subterranean formation has a very low reactivity with the composition that is introduced therein.

In such cases, the compositions that are introduced into the formation as treatment fluids cannot penetrate into the formation due to their low reactivity and remain trapped in the near wellbore area even when the injection pressure is increased, resulting in a number of unwanted effects, including wash-out, reduction of the rock strength due to prolonged interaction with the treatment fluid and the pressure, increased risk of reaction with the cementing material located between the wellbore walls and the tubular, and increased risk of fracturing. In some instances only a porosity increase is found instead of both a porosity and a permeability increase. If a permeability increase is found in such treatments, it is subject to improvement.

For these reasons there is a need in the art to develop improved processes to treat formations with such compositions that do not show the above disadvantages and give a higher permeability increase.

The present invention aims to provide an improved process to treat subterranean formations wherein chelating agent-based compositions that are suitable for use in treating subterranean formations are introduced using a different regime.

The invention now provides a process of treating a subterranean formation with a composition containing between 1 and 40 wt % on total weight of the composition of a chelating agent selected from the group of glutamic acid N,N-diacetic acid or a salt thereof (GLDA), aspartic acid N,N-diacetic acid or a salt thereof (ASDA), and methylglycine N,N-diacetic acid or a salt thereof (MGDA), wherein the process contains a soaking step.

A soaking step is defined as a step wherein the formation is contacted with the above treatment composition while reducing the flow rate with which the composition is moved through the formation, such to allow the composition time to react with the components in the formation. Or to phrase it differently, a process of treating a formation comprising a soaking step means that the treatment composition is introduced into the formation after which, when the composition flows into the formation, during the soaking step the flow rate of the composition is purposively decreased for a period of time, and wherein next this flow rate is again increased, the latter increased flow being in either the same original direction or another direction (giving a so-called reverse flow). Purposively means that the flow rate of the treatment composition is actively changed, for example, by using an apparatus such as a pump, gas lift, or valve, and does not include variations in flow rate locally in a formation due to circumstances in the formation, like a varying permeability.

It should be noted that US 2004254079 also discloses a process to acidize including a soaking step. The acid is HF based, contains the chelating agent N-hydroxyethyl ethylene N,N',N'-triacetic acid (HEDTA), and is specifically designed for treating sandstone formations.

It was found that, contrary to many state of the art processes such as the above using HEDTA, when performing the process of the invention a more selective dissolution of the narrow pore throats was achieved, resulting in a more favourable ratio between permeability and porosity.

There are several ways to achieve a soaking step. Because normally the treatment composition is pumped into the formation, the most preferred way involves just reducing the pumping speed or completely switching off the pumps for a period of time, preferably while keeping the pressure at least equal to the formation pressure, in order to avoid flowback of liquids or gas from the formation into the wellbore during the soaking step. The period of time for the reduced flow rate, i.e. the soaking step, is preferably between about 10 minutes and 24 hours, and more preferably 30 minutes to 12 hours, most preferably 1 to 6 hours.

In another preferred embodiment the process contains more than one soaking step.

The compositions used in the process of the invention can be fluids, emulsified, foamed, or viscosified compositions.

Emulsified composition is defined in this application as a composition that is a mixture of a dispersed phase containing the chelating agent in a continuous phase, wherein the emulsified chelating agent does not dissolve in the continuous phase but will be dispersed in the continuous phase in small (aqueous) droplets. The emulsifier (also called: emulsifying agent) acts as a barrier between the dispersed phase and the continuous phase.

Viscosified composition is defined in this application as a composition that has a higher viscosity than the same composition without a viscosifying agent when using an AR2000 rheometer from TA instruments using a cone and plate geometry at 20° C. or another relevant temperature as specified herein, wherein the cone is stainless steel with a 40 mm diameter and a 4° angle (SST 40 mm 4°) and heating is done using a Peltier element. The test is applied by varying the shear rate from 0.1 to 1000 s$^{-1}$. Preferably, the viscosity of the viscosified composition is higher than 10 mPa·s, more preferably higher than 50 mPa·s at a shear rate of 100 s$^{-1}$.

When the composition is a foamed composition, besides the chelating agent and a solvent or liquid (often water) it contains a foaming agent and a gas.

The subterranean formation in one embodiment can be a carbonate formation, a shale formation, or a sandstone formation, and in a preferred embodiment is a formation with a low dissolution rate in the treatment fluid, like dolomite or calcite. In a preferred embodiment, the dissolution rate is lower than $5·10^{-6}$ gmole/cm$^2$·s, even more preferably, the dissolution rate is lower than $5·10^{-7}$ gmole/cm$^2$·s as measured with a rotating disk apparatus at 1,000 rpm at 250° F. (121° C.) using the composition of the present invention. In another embodiment the dissolution rate is preferably higher than $5·10^{-12}$ gmole/cm$^2$·s at 121° C. Reference is made to Adenuga, O. O. et al. in "Reactions of Simple Organic Acids and Chelating agents with Dolomite" presented at the SPE Production and Operations Symposium held in Oklahoma City, USA, 23-26 Mar. 2013, published as SPE 164480. This document gives more details on how to measure the dissolution rate.

In yet another embodiment the formations have a natural permeability of <10 mD. Preferably, the natural permeability is more than 0.01 mD.

The term "treating" in this application is intended to cover any treatment of the formation with the composition. It specifically covers treating the formation with the composition to achieve at least one of (i) an increased permeability, (ii) the removal of small particles, and (iii) the removal of inorganic scale, and so enhance the well performance and enable an increased production of oil and/or gas from the formation. An example of a treatment process is an acidizing process wherein small amounts of the formation itself or of damage in the formation are dissolved and/or removed by reaction with the chelating agent. At the same time, next to treating the formation in the same process, the processes of the invention may simultaneously and additionally cover cleaning of the wellbore and descaling of the oil/gas production well and production equipment.

The amounts of chelating agent, foaming agent, and viscosifying agent in wt % or ppm are based on the total weight of the fluid or composition in which they are present; the amount of gas or emulsifier in vol % is on the basis of the total volume of the composition.

The chelating agent is preferably present in the fluid or composition in an amount of between 5 and 30 wt %, more preferably between 10 and 30 wt %, even more preferably between 15 and 25 wt %, on the basis of the total weight of the composition, and when an emulsified composition is applied on the basis of the total weight of the dispersed phase.

When the composition is an emulsified composition, it contains a dispersed phase emulsified in a continuous phase containing the chelating agent and at least 0.01 vol % on total volume of the composition of an emulsifying agent.

The emulsifying agent is preferably present in the emulsified composition in an amount of between 0.01 and 10 vol %, more preferably between 0.5 and 3.0 vol %, even more preferably between 1 and 2 vol %, on total volume of the composition.

The continuous phase is generally based on a hydrocarbon liquid in which the chelating agents do not dissolve, which in one embodiment is chosen from diesel, light crude oil, xylene, gasoline, toluene, kerosene, other aromatics, refined hydrocarbons, and mixtures thereof. In preferred embodiments, the continuous phase is chosen from the group of xylene, diesel, light crude oil or mixtures thereof. Xylene is preferred if an asphaltene is present in the composition.

The gas is preferably present in the foamed composition in an amount of between 50 and 99 vol %, preferably between 50 and 80 vol %, even more preferably 60-70 vol %, on total foam volume.

The foaming agent in one embodiment is a surfactant. Preferably, the foaming agent is a water-soluble surfactant, as the foams of the invention are preferably water-based. Water-soluble means for this invention: soluble in an amount of at least 2 g/l of water.

The foaming agent in one embodiment is used in an amount of between 10 ppm and 200,000 ppm on the basis of the total weight of the foam, preferably between 10 ppm and 100,000 ppm, even more preferably 100 and 50,000 ppm, most preferably between 100 and 10,000 ppm.

When the composition is a viscosified composition, besides the chelating agent and the solvent or liquid (often water) it contains a viscosifying agent (also called viscosifier).

The viscosifying agent is preferably present in an amount of between 0.01 and 3 wt %, more preferably between 0.01 and 2 wt %, even more preferably between 0.05 and 1.5 wt %, on total weight of the viscosified composition.

The chelating agent in a preferred embodiment is GLDA, or ASDA, even more preferably GLDA.

The gas in one embodiment is selected from the group of $N_2$, CO, $CO_2$, natural gas, oxygen or mixtures thereof, like air. Preferably, $N_2$, air, or natural gas is used.

The process of the invention is preferably performed at a temperature of between 35 and 400° F. (about 2 and 204° C.), more preferably between 77 and 400° F. (about 25 and 204° C.). Even more preferably, the temperature during the process is in the range where the fluids or compositions of the invention best achieve the desired effects, which means a temperature of between 77 and 350° F. (about 25 and 177° C.), most preferably between 150 and 300° F. (about 65 and 149° C.).

The process of the invention when it is a matrix-acidizing treatment process is preferably performed at a pressure between atmospheric pressure and fracture pressure, wherein fracture pressure is defined as the pressure above which injection of the compositions will cause the formation to fracture hydraulically, and when it is an acid-fracturing process is preferably performed at a pressure above the fracture pressure of the producing zone(s). A person skilled in the art will understand that the fracture pressure depends on parameters such as type, depth of the formation, and downhole stresses, and can be different for any reservoir.

Salts of GLDA, ASDA, and MGDA that can be used are the alkali metal, alkaline earth metal, or ammonium full and partial salts. Also mixed salts containing different cations can be used. Preferably, the sodium, potassium, and ammonium full or partial salts of GLDA, ASDA, and MGDA are used.

The compositions of the invention are preferably aqueous compositions, i.e., they preferably contain water as a solvent for the other ingredients, wherein the water can be, e.g., fresh water, aquifer water, produced water, seawater or any combinations of these waters, though other solvents may be added as well, as further explained below.

The pH of the compositions of the invention and as used in the process can range from 1 to 6. Preferably, however, it is between 2 and 5, as in the very acidic range of up to 2 some undesired side effects may be caused by the compositions in the formation, such as too fast dissolution of carbonate giving excessive $CO_2$ formation or an increased risk of reprecipitation. In addition, it must be realized that highly acidic solutions are more expensive to prepare and are very corrosive to well completion and tubulars, especially at high temperatures. Consequently, the compositions even more preferably have a pH of 3.5 to 5.

The composition may contain other additives that improve the functionality of the stimulation action and minimize the risk of damage as a consequence of the said treatment, as is known to anyone skilled in the art. It should be understood that the several additives can be part of a main treatment composition but can be included equally well in a preflush or postflush composition. In such embodiments the composition of the invention is effectively a kit of parts wherein each part contains part of the components of the total composition, for example, one part that is used for the main treatment contains the composition of the invention and one or more other parts contain one or more of the other additives, such as for example a surfactant or mutual solvent.

The composition of the invention may in addition contain one or more of the group of anti-sludge agents, (water-wetting or emulsifying) surfactants, surfactant mixtures, corrosion inhibitors, mutual solvents, corrosion inhibitor intensifiers, additional foaming agents, viscosifiers, wetting agents, diverting agents, oxygen scavengers, carrier fluids, fluid loss additives, friction reducers, viscosity stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, consolidating agents (such as resins and/or tackifiers), combinations thereof, or the like.

When the composition is a foamed composition, foam formation can be achieved along several routes. In one embodiment, a suitable foam is obtained by including a mixture of surfactants as foaming agents in the solution containing the chelating agent. Suitable surfactants may be anionic, cationic, amphoteric or nonionic in nature, or their mixtures. The person skilled in the art is fully aware that in the case of surfactants having opposite charges, a non-stoichiometric ratio must be chosen. Preferably, the molar ratio is higher than 3 to 1. More preferably, it is higher than 5:1 and most preferably, it is higher than 10:1. It is also preferred that the surfactant mixture is soluble in water (i.e. in an amount of at least 2 g/l water, preferably at least 10 g/l of water). It is more preferred that the surfactant mixture is soluble in the aqueous system containing up to 5% on total weight of a chelating agent. Suitable surfactant mixtures may be mixtures of surfactants which are all soluble in the described solutions. However, surfactant mixtures may also contain one or more (co-)surfactants which are insoluble in the described solutions. It is known to the person skilled in the art that the portion of insoluble surfactants is bound to limits. When expressed in weight ratios, the preferred ratio of insoluble to soluble surfactant is less than 2. More preferably, it is less than 1 and most preferably, it is less than ⅓ (one third).

When the composition is a viscosified composition, the viscosifier in one embodiment can be chosen from carbohydrates, or from polysaccharides such as cellulosic derivatives, guar or guar derivatives, xanthan, carrageenan, starch biopolymers, several gums, polyacrylamides, polyacrylates, viscoelastic surfactants [e.g. amine oxides, carboxybetaines].

In another embodiment, the compositions of the present invention may comprise a foam extender, as for example disclosed in WO 2007/020592.

When a viscosifier is present, the compositions may in addition contain a crosslinking agent capable of crosslinking the viscosifier and thereby improving the properties of the composition. Crosslinking agents are for example disclosed in WO 2007/020592.

The viscosifiers include chemical species which are soluble, at least partially soluble and/or insoluble in the chelating agent-containing starting fluid. The viscosifiers may also include various insoluble or partially soluble organic and/or inorganic fibres and/or particulates, e.g., dispersed clay, dispersed minerals, and the like, which are known in the art to increase viscosity. Suitable viscosifiers further include various organic and/or inorganic polymeric species including polymer viscosifying agents, especially metal-crosslinked polymers. Suitable polymers for making the metal-crosslinked polymer viscosifiers include, for example, polysaccharides, e.g., substituted galactomannans, such as guar gums, high-molecular weight polysaccharides composed of mannose and galactose sugars, or guar derivatives such as hydroxypropyl guar (HPG), carboxymethyl hydroxypropyl guar (CMHPG), and carboxymethyl guar (CMG), hydrophobically modified guars, guar-containing compounds, and synthetic polymers. Crosslinking agents which include boron, titanium, zirconium and/or aluminium complexes are preferably used to increase the effective molecular weight of the polymers and make them better suited for use as viscosity-increasing agents, especially in high-temperature wells. Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof, polyethylene imines, polydiallyl dimethyl ammonium chloride, polyamines like copolymers of dimethylamine and epichlorohydrin, copolymers of acrylamide and cationic monomers, like diallyl dimethyl ammonium chloride (DADMAC) or acryloyloxyethyl trimethyl ammonium chloride, copolymers of acrylamide containing anionic as well as cationic groups. More specific examples of other typical water-soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkylene oxides, other galactomannans, heteropolysaccharides obtained by the fermentation of starch-derived sugar and ammonium and alkali metal salts thereof. Cellulose derivatives, including hydroxyethyl cellulose (HEC), hydroxypropyl cellulose (HPC), carboxymethyl-hydroxyethyl cellulose (CMHEC) and/or carboxymethyl cellulose (CMC), with or without crosslinkers, xanthan, diutan, and scleroglucan are also preferred.

Still other viscosifiers include clay-based viscosifiers, platy clays, like bentonites, hectorites or laponites, and small fibrous clays such as the polygorskites (attapulgite and sepiolite). When using polymer-containing viscosifiers as further viscosifiers, the viscosifiers may be used in an amount of up to 5% by weight of the compositions of the invention.

When the composition of the invention is an emulsified composition, the emulsifier can be a nonionic, anionic, cationic or amphoteric surfactant, polymeric surfactant or pickering emulsifier. Pickering emulsifiers are emulsifiers that stabilize an emulsion by relying on the effect of solid particles (for example colloidal silica) that adsorb onto the interface between the two phases.

It is common to express the property of a surfactant mixture by its hydrophilic-lipophilic balance, the so-called HLB. The HLB of non-ionic surfactants can be simply calculated by applying Griffin's formula:

$$HLB = 20 \times (\text{molar mass of the hydrophilic portion of the molecule})/(\text{molar mass of the molecule})$$

Example:
Decylalcohol ethoxylate (8EO): $C_{10}$-$EO_8$
Hydrophobic part: $CH_3(CH_2)_9$—OH molar mass=158
Hydrophilic part: $[CH_2CH_2O]_8$ molar mass=352
HLB for $C_{10}$-$EO_8$ is $20 \times 352/(352+158) = 13.8$ The HLB of surfactants having ionic portions is calculated by Davis's formula rather than Griffin's:
$HLB = 7 + \Sigma(\text{Hydrophilic group contributions}) - \Sigma(\text{Hydrophobic group contributions})$, in which case the following tables need to be used in finding the increments, see Tables A-D in Technical Information Surface Chemistry: HLB & Emulsification, link: http://www.scribd.com/doc/56449546/HLB-Emulsification.

Table A has been retrieved:

TABLE A

| anionic hydrophilic group contributions | |
|---|---|
| hydrophilic group | HLB contribution |
| —COO—$Na^+$ | 19.1 |
| —$SO_3$—$Na^+$ | 20.7 |
| —O—$SO_3$—$Na^+$ | 20.8 |

Example:
Tetradecyl ammonium chloride: $C_{14}$—$N(CH_3)_3{}^+Cl^-$
Group contributions of the hydrophobic groups:
—CH3: 1×0.475
—CH2-: 13×0.475
Group contributions of the hydrophilic groups:
—$N(CH_3)_3{}^+Cl^-$ 22.0
HLB for $C_{14}$—$N(CH_3)_3{}^+Cl^-$ is $7+22.0-(14 \times 0.475) = 22.4$ The HLB of surfactant mixtures is simply the weight average of the HLBs of the individual surfactant types.

In one embodiment the HLB of the emulsifying agent is about 20 or below; alternatively, the HLB is about 10 or below; and in another embodiment it is about 8 or below.

In another embodiment, a suitable emulsion is obtained by including polymeric surfactants as emulsifiers. Examples of polymeric surfactants are partially hydrolyzed polyvinyl acetate, partially hydrolyzed modified polyvinyl acetate, block or co-polymers of alkenes such as polyethylene, polypropylene, polybutylene or polypentylene, proteins, and partially hydrolyzed polyvinyl acetate, polyacrylate and derivatives of polyacrylates, polyvinyl pyrrolidone and derivatives. The additional application of further surfactants to the polymeric surfactant is beneficial to the emulsion quality or lifetime.

Examples of emulsifiers include, but are not limited to, quaternary ammonium compounds (e.g., trimethyl tallow ammonium chloride, trimethyl coco ammonium chloride, dimethyl dicoco ammonium chloride, etc.), derivatives thereof, and combinations thereof, low HLB surfactants or oil-soluble surfactants. More specific suitable emulsifiers include, but are not necessarily limited to, polysorbates, alkyl sulfosuccinates, alkyl phenols, ethoxylated alkyl phenols, alkyl benzene sulfonates, fatty acids, ethoxylated fatty acids, propoxylated fatty acids, fatty acid salts, tall oils, castor oils, triglycerides, ethoxylated triglycerides, alkyl glucosides, and mixtures and derivatized fatty acids such as those disclosed in U.S. Pat. No. 6,849,581. Suitable polysorbates include, but are not necessarily limited to, sorbitan monolaurate, sorbitan monopalmitate, sorbitan monostearate, sorbitan monooleate, sorbitan monodecanoate, sorbitan monooctadecanoate, sorbitan trioleate and the like, and ethoxylated derivatives thereof. For instance, emulsifiers may have up to 20 ethoxy groups thereon. Suitable emulsifiers include stearyl alcohol, lecithin, fatty acid amines, ethoxylated fatty acid amines, and mixtures thereof. In some embodiments, more than one emulsifier may be used. Preferably, the emulsifier is cationic, such as an emulsifier that contains quaternary ammonium group-containing components.

The mutual solvent is a chemical additive that is soluble in oil, water, acids (often HCl-based), and other well treatment fluids (see also www.glossary.oilfield.slb.com). Mutual solvents are routinely used in a range of applications, controlling the wettability of contact surfaces before, during and/or after a treatment, and preventing or breaking up emulsions. Mutual solvents are used, as insoluble formation fines pick up organic film from crude oil. These particles are partially oil-wet and partially water-wet. This causes them to collect materials at any oil-water interface, which can stabilize various oil-water emulsions. Mutual solvents remove organic films leaving them water-wet, thus emulsions and particle plugging are eliminated. If a mutual solvent is employed, it is preferably selected from the group which includes, but is not limited to, lower alcohols such as methanol, ethanol, 1-propanol, 2-propanol, and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through C10-esters, and substantially water/oil-soluble ketones, such as one or more C2-C10 ketones, wherein substantially soluble means soluble in more than 1 gram per liter, preferably more than 10 grams per liter, even more preferably more than 100 grams per liter, most preferably more than 200 grams per liter. The mutual solvent is preferably present in an amount of 1 to 50 wt % on total composition.

A preferred water/oil-soluble ketone is methylethyl ketone.

A preferred substantially water/oil-soluble alcohol is methanol.

A preferred substantially water/oil-soluble ester is methyl acetate.

A more preferred mutual solvent is ethylene glycol monobutyl ether, generally known as EGMBE The amount of glycol solvent in the composition is preferably about 1 wt % to about 10 wt %, more preferably between 3 and 5 wt %. More preferably, the ketone solvent may be present in an amount from 40 wt % to about 50 wt %; the substantially water-soluble alcohol may be present in an amount within the range of about 20 wt % to about 30 wt %; and the substantially water/oil-soluble ester may be present in an amount within the range of about 20 wt % to about 30 wt %, each amount being based upon the total weight of the solvent in the composition.

The surfactant (water-wetting surfactants as well as surfactants used as foaming agent, viscosifying agent or emulsifying agent) can be any surfactant known in the art and includes anionic, cationic, amphoteric, and nonionic surfactants. The choice of surfactant is initially determined by the nature of the rock formation around the well. The application of cationic surfactants is best limited in the case of sandstone, while in the case of carbonate rock, anionic surfactants are not preferred. Hence, the surfactant (mixture) is predominantly anionic in nature when the formation is a sandstone formation. When the formation is a carbonate formation, the surfactant (mixture) is preferably predominantly nonionic or cationic in nature, even more preferably predominantly cationic.

The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides, and the like, and mixtures thereof. Alkoxylated alcohols, preferably ethoxylated alcohols, optionally in combination with (alkyl) polyglycosides, are the most preferred nonionic surfactants.

The anionic surfactants may comprise any number of different compounds, including alkyl sulfates, alkyl sulfonates, alkylbenzene sulfonates, alkyl phosphates, alkyl phosphonates, alkyl sulfosuccinates.

The amphoteric surfactants include hydrolyzed keratin, taurates, sultaines, phosphatidyl cholines, betaines, modified betaines, alkylamidobetaines (e.g., cocoamidopropyl betaine).

The cationic surfactants include alkyl amines, alkyl dimethylamines, alkyl trimethylamines (quaternary amines), alkyl diethanolamines, dialkyl amines, dialkyl dimethylamines, and less common classes based on phosphonium, sulfonium. In preferred embodiments, the cationic surfactants may comprise quaternary ammonium compounds (e.g., trimethyl tallow ammonium chloride, trimethyl coco ammonium chloride), derivatives thereof, and combinations thereof.

Examples of surfactants that are also foaming agents that may be utilized to foam and stabilize the treatment compositions of this invention include, but are not limited to, betaines, amine oxides, methyl ester sulfonates, alkylamidobetaines such as cocoamidopropyl betaine, alpha-olefin sulfonate, trimethyl tallow ammonium chloride, C8 to C22 alkyl ethoxylate sulfate, and trimethyl coco ammonium chloride.

The foaming agent, if used, is normally used in an amount of between 10 and 200,000 ppm based on the total weight of the composition, preferably between 100 and 10,000 ppm.

Suitable surfactants may be used in a liquid or solid form, like a powder, granule or particulate form.

Where used, the surfactants may be present in the composition in an amount sufficient to prevent incompatibility with formation fluids, other treatment fluids, or wellbore fluids at reservoir temperature.

In an embodiment where liquid surfactants are used, the surfactants are generally present in an amount in the range of from about 0.01% to about 5.0% by volume of the composition.

In one embodiment, the liquid surfactants are present in an amount in the range of from about 0.1% to about 2.0% by volume of the composition, more preferably between 0.1 and 1 vol %.

In embodiments where powdered surfactants are used, the surfactants may be present in an amount in the range of from about 0.001% to about 0.5% by weight of the composition.

The anti-sludge agent can be chosen from the group of mineral and/or organic acids used to stimulate sandstone hydrocarbon-bearing formations. The function of the acid is to dissolve acid-soluble materials so as to clean or enlarge the flow channels of the formation leading to the wellbore, allowing more oil and/or gas to flow to the wellbore.

Problems can be caused by the interaction of the (usually concentrated, 20-28%) stimulation acid and certain crude oils (e.g. asphaltic oils) in the formation to form sludge. Interaction studies between sludging crude oils and the introduced acid show that permanent rigid solids are formed at the acid-oil interface when the aqueous phase is below a pH of about 4. No films are observed for non-sludging crudes with acid.

These sludges are usually reaction products formed between the acid and the high molecular weight hydrocarbons such as asphaltenes, resins, etc.

Methods for preventing or controlling sludge formation with its attendant flow problems during the acidization of crude-containing formations include adding "anti-sludge" agents to prevent or reduce the rate of formation of crude oil sludge, which anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

The carrier fluids are aqueous solutions which in certain embodiments contain a Bronsted acid to keep the pH in the desired range and/or contain an inorganic salt, preferably NaCl or KCl.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2 vol %, more preferably between 0.1 and 1 vol % on the total composition.

One or more corrosion inhibitor intensifiers may be added, such as for example formic acid, potassium iodide, antimony chloride, or copper iodide.

One or more salts may be used as rheology modifiers to further modify the rheological properties (e.g., viscosity and elastic properties) of the compositions. These salts may be organic or inorganic.

Examples of suitable organic salts include, but are not limited to, aromatic sulfonates and carboxylates (such as p-toluene sulfonate and naphthalene sulfonate), hydroxynaphthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethyl ammonium hydrochloride, and tetramethyl ammonium chloride.

Examples of suitable inorganic salts include water-soluble potassium, sodium, and ammonium halide salts (such as potassium chloride and ammonium chloride), calcium chloride, calcium bromide, magnesium chloride, sodium formate, potassium formate, cesium formate, and zinc halide salts. A mixture of salts may also be used, but it should be noted that preferably chloride salts are mixed with chloride salts, bromide salts with bromide salts, and formate salts with formate salts.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, and the like. A mixture of salts may also be used in the brines, but it should be noted that preferably chloride salts are mixed with chloride salts, bromide salts with bromide salts, and formate salts with formate salts.

The brine chosen should be compatible with the formation and should have a sufficient density to provide the appropriate degree of well control.

Additional salts may be added to a water source, e.g., to provide a brine, and a resulting treatment composition, in order to have a desired density.

The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops.

Preferred suitable brines may include seawater and/or formation brines.

Salts may optionally be included in the composition of the present invention for many purposes, including for reasons related to compatibility of the composition with the formation and the formation fluids.

To determine whether a salt may be beneficially used for compatibility purposes, a compatibility test may be performed to identify potential compatibility problems.

From such tests, one of ordinary skill in the art will, with the benefit of this disclosure, be able to determine whether a salt should be included in a composition of the present invention.

Suitable salts include, but are not limited to, calcium chloride, sodium chloride, magnesium chloride, potassium chloride, sodium bromide, potassium bromide, ammonium chloride, sodium formate, potassium formate, cesium formate, and the like. A mixture of salts may also be used, but it should be noted that preferably chloride salts are mixed with chloride salts, bromide salts with bromide salts, and formate salts with formate salts.

The amount of salt to be added should be the amount necessary for the required density for formation compatibility, such as the amount necessary for the stability of clay minerals, taking into consideration the crystallization temperature of the brine, e.g., the temperature at which the salt precipitates from the brine as the temperature drops.

Salt may also be included to increase the viscosity of the composition and stabilize it, particularly at temperatures above 180° F. (about 82° C.).

Examples of suitable pH control additives which may optionally be included in the composition of the present invention are acids and/or bases.

A pH control additive may be necessary to maintain the pH of the composition at a desired level, e.g., to improve the effectiveness of certain breakers and to reduce corrosion on any metal present in the wellbore or formation, etc.

One of ordinary skill in the art will, with the benefit of this disclosure, be able to recognize a suitable pH for a particular application.

In one embodiment, the pH control additive may be an acidic composition.

Examples of suitable acids may comprise an acid, an acid-generating compound, and combinations thereof.

Any known acid may be suitable for use with the compositions of the present invention.

Examples of acids that may be suitable for use in the present invention include, but are not limited to, organic acids (e.g., formic acids, acetic acids, carbonic acids, citric acids, glycolic acids, lactic acids, p-toluene sulfonic acid, ethylene diamine tetraacetic acid (EDTA), hydroxyethyl ethylene diamine triacetic acid (HEDTA), and the like), inorganic acids (e.g., hydrochloric acid, hydrofluoric acid, phosphonic acid, and the like), and combinations thereof. Preferred acids are HCl (in an amount compatible with the illite content) and organic acids.

Examples of acid-generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(epsilon-caprolactones), poly(hydroxybutyrates), poly(anhydrides), or copolymers thereof.

Derivatives and combinations also may be suitable.

The term "copolymer" as used herein is not limited to the combination of two polymers, but includes any combination of polymers, e.g., terpolymers and the like. Other suitable acid-generating compounds include: esters including, but not limited to, ethylene glycol monoformate, ethylene glycol diformate, diethylene glycol diformate, glyceryl monoformate, glyceryl diformate, glyceryl triformate, methylene glycol diformate, and formate esters of pentaerythritol.

The pH control additive also may comprise a base to elevate the pH of the composition.

Generally, a base may be used to elevate the pH of the mixture to greater than or equal to about 7.

Having the pH level at or above 7 may have a positive effect on a chosen breaker being used and may also inhibit the corrosion of any metals present in the wellbore or formation, such as tubing, screens, etc.

In addition, having a pH greater than 7 may also impart greater stability to the viscosity of the treatment composition, thereby enhancing the length of time that viscosity can be maintained.

This could be beneficial in certain uses, such as in longer-term well control and in diverting.

Any known base that is compatible with the components in the emulsified compositions of the present invention can be used in the emulsified compositions of the present invention.

Examples of suitable bases include, but are not limited to, sodium hydroxide, potassium carbonate, potassium hydroxide, sodium carbonate, and sodium bicarbonate.

One of ordinary skill in the art will, with the benefit of this disclosure, recognize the suitable bases that may be used to achieve a desired pH elevation.

In some embodiments, the composition may optionally comprise a further chelating agent.

When added, the chelating agent may chelate any dissolved iron (or other divalent or trivalent cations) that may be present and prevent any undesired reactions being caused.

Such a chelating agent may, e.g., prevent such ions from crosslinking the gelling agent molecules.

Such crosslinking may be problematic because, inter alia, it may cause filtration problems, injection problems and/or again cause permeability problems.

Any suitable chelating agent may be used with the present invention.

Examples of suitable chelating agents include, but are not limited to, citric acid, nitrilotriacetic acid (NTA), any form of ethylene diamine tetraacetic acid (EDTA), diethylene triamine pentaacetic acid (DTPA), propylene diamine tetraacetic acid (PDTA), ethylene diamine-N,N"-di(hydroxyphenyl) acetic acid (EDDHA), ethylene diamine-N,N"-di-(hydroxy-methylphenyl) acetic acid (EDDHMA), ethanol diglycine (EDG), trans-1,2-cyclohexylene dinitrilotetraacetic acid (CDTA), glucoheptonic acid, gluconic acid, sodium citrate, phosphonic acid, salts thereof, and the like.

In some embodiments, the chelating agent may be a sodium or potassium salt.

Generally, the chelating agent may be present in an amount sufficient to prevent undesired side effects of divalent or trivalent cations that may be present, and thus also functions as a scale inhibitor.

One of ordinary skill in the art will, with the benefit of this disclosure, be able to determine the proper concentration of a chelating agent for a particular application.

In some embodiments, the compositions of the present invention may contain bactericides or biocides, inter alia, to protect the subterranean formation as well as the composition from attack by bacteria. Such attacks can be problematic because they may lower the viscosity of the composition, resulting in poorer performance, such as poorer sand suspension properties, for example.

Any bactericides known in the art are suitable. Biocides and bactericides that protect against bacteria that may attack GLDA, ASDA, or MGDA are preferred, in addition to bactericides or biocides that control or reduce typical downhole microorganisms, like sulfate reducing bacteria (SRB).

An artisan of ordinary skill will, with the benefit of this disclosure, be able to identify a suitable bactericide and the proper concentration of such bactericide for a given application.

Examples of suitable bactericides and/or biocides include, but are not limited to, phenoxyethanol, ethylhexyl glycerine, benzyl alcohol, benzyl alkonium, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. In one embodiment, the bactericides are present in the composition in an amount in the range of from about 0.001% to about 1.0% by weight of the composition.

Compositions of the present invention also may comprise breakers capable of assisting in the reduction of the viscosity of the composition at a desired time.

Examples of such suitable breakers for the present invention include, but are not limited to, oxidizing agents such as sodium chlorites, sodium bromate, hypochlorites, perborate, persulfates, and peroxides, including organic peroxides. Other suitable breakers include, but are not limited to, suitable acids and peroxide breakers, triethanol amine, as well as enzymes that may be effective in breaking. The breakers can be used as is or encapsulated.

Examples of suitable acids may include, but are not limited to, hydrochloric acid, hydrofluoric acid, formic acid, acetic acid, citric acid, lactic acid, glycolic acid, chlorous acid, etc.

A breaker may be included in the composition of the present invention in an amount and form sufficient to achieve the desired viscosity reduction at a desired time.

The breaker may be formulated to provide a delayed break, if desired.

The compositions of the present invention also may comprise suitable fluid loss additives.

Such fluid loss additives may be particularly useful when a composition of the present invention is used in a fracturing application or in a composition that is used to seal a formation against invasion of fluid from the wellbore.

Any fluid loss agent that is compatible with the compositions of the present invention is suitable for use in the present invention.

Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

Another example of a suitable fluid loss additive is one that comprises a degradable material.

Suitable examples of degradable materials include polysaccharides such as dextran or cellulose; chitins; chitosans; proteins; aliphatic polyesters; poly(lactides); poly(glycolides); poly(glycolide-co-lactides); poly(epsilon-caprolactones); poly(3-hydroxybutyrates); poly(3-hydroxybutyrate-co-hydroxyvalerates); poly(anhydrides); aliphatic poly (carbonates); poly(ortho esters); poly(amino acids); poly (ethylene oxides); poly(phosphazenes); derivatives thereof; or combinations thereof.

In some embodiments, a fluid loss additive may be included in an amount of about 5 to about 2,000 lbs/Mgal (about 600 to about 240,000 g/Mliter) of the composition.

In some embodiments, the fluid loss additive may be included in an amount from about 10 to about 50 lbs/Mgal (about 1,200 to about 6,000 g/Mliter) of the composition.

In certain embodiments, a stabilizer may optionally be included in the compositions of the present invention.

It may be particularly advantageous to include a stabilizer if a (too) rapid viscosity degradation is experienced.

One example of a situation where a stabilizer might be beneficial is where the BHT (bottom hole temperature) of the wellbore is sufficient to break the composition by itself without the use of a breaker.

Suitable stabilizers include, but are not limited to, sodium thiosulfate, methanol, and salts such as formate salts and potassium or sodium chloride.

Such stabilizers may be useful when the compositions of the present invention are utilized in a subterranean formation having a temperature above about 200° F. (about 93° C.). If included, a stabilizer may be added in an amount of from about 1 to about 50 lbs/Mgal (about 120 to about 6,000 g/Mliter) of the composition.

Scale inhibitors may be added, for example, when the compositions of the invention are not particularly compatible with the formation waters in the formation in which they are used.

These scale inhibitors may include water-soluble organic molecules with carboxylic acid, aspartic acid, maleic acids, sulfonic acids, phosphonic acid, and phosphate ester groups including copolymers, ter-polymers, grafted copolymers, and derivatives thereof.

Examples of such compounds include aliphatic phosphonic acids such as diethylene triamine penta (methylene phosphonate) and polymeric species such as polyvinyl sulfonate.

The scale inhibitor may be in the form of the free acid but is preferably in the form of mono- and polyvalent cation salts such as Na, K, Al, Fe, Ca, Mg, $NH_4$. Any scale inhibitor that is compatible with the composition in which it will be used is suitable for use in the present invention.

Suitable amounts of scale inhibitors that may be included may range from about 0.05 to 100 gallons per about 1,000 gallons (i.e. 0.05 to 100 liters per 1,000 liters) of the composition.

Any particulates such as proppant, gravel that are commonly used in subterranean operations may be used in the present invention (e.g., sand, gravel, bauxite, ceramic materials, glass materials, wood, plant and vegetable matter, nut hulls, walnut hulls, cotton seed hulls, cement, fly ash, fibrous materials, composite particulates, hollow spheres and/or porous proppant).

It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In some embodiments, coated particulates may be suitable for use in the treatment compositions of the present invention. It should be noted that many particulates also act as diverting agents. Further diverting agents are viscoelastic surfactants and in-situ gelled fluids.

Oxygen scavengers may be needed to enhance the thermal stability of the GLDA, ASDA, or MGDA. Examples thereof are sulfites and ethorbates.

Friction reducers can be added in an amount of up to 0.2 vol %. Suitable examples are viscoelastic surfactants and enlarged molecular weight polymers.

Further crosslinkers can be chosen from the group of multivalent cations that can crosslink polymers such as Al, Fe, B, Ti, Cr, and Zr, or organic crosslinkers such as polyethylene amines, formaldehyde.

Sulfide scavengers can suitably be an aldehyde or ketone.

Viscoelastic surfactants can be chosen from the group of amine oxides, carboxyl butane-based surfactants, or betaine surfactants.

High-temperature applications may benefit from the presence of an oxygen scavenger in an amount of less than about 2 vol % of the solution.

In the process of the invention, the composition can be flooded back from the formation. Even more preferably, (part of) the composition is recycled.

It must be realized, however, that GLDA, ASDA and MGDA, being biodegradable chelating agents, will not flow back completely and therefore are not recyclable to the full extent.

The invention is further illustrated by the Examples below.

EXAMPLES

Experiments 1-6

GLDA with a concentration of 20 wt % and pH of 3.8 was prepared from an original solution of Dissolvine® GL-NA-36-S obtained from AkzoNobel. The original GLDA concentration was 38 wt %. Deionized water, obtained from a water purification system, which has a resistivity of 18.2 MΩ·cm at room temperature, was used to prepare the 20 wt % GLDA solution.

Dolomite cores were obtained from a quarry. XRD and XRF analyses confirmed that the composition of the cores was almost fully dolomite with a dissolution rate of about $5 \cdot 10^{-7}$ gmole/$cm^2 \cdot s$ at 250° F. (121° C.). The cores were 3.6 inches (9.14 cm) long and 1.5 inches (3.81 cm) in diameter. Prior to treatment, they were dried and the dry weight was measured. Subsequently, they were saturated with deionized water and their pore volume (PV) and initial permeability were measured.

The static coreflood experiments were performed at a back pressure of 1,100 PSI (75.8 bar) and an overburden pressure of 1,600 PSI (110.3 bar), whereas the dynamic coreflood experiments were performed at 1,400 PSI (96.5 bar) and 1,900 PSI (131 bar), respectively. All coreflood experiments were performed at a temperature of 275° F. (135° C.).

Furthermore, the initial and final permeabilities ki and kf, respectively, were determined using water at room temperature, a back pressure of 500 PSI (34.4 bar), and an overburden pressure of 800 PSI (55.2 bar) before and after the treatments. The pressure drop was used to calculate the permeabilities using Darcy's law for laminar, linear, and steady-state flow of Newtonian fluids in porous media:

$$k = (122,81 q \mu L)/(\Delta p D^2)$$

where k is the core permeability [md], q is the flow rate [cm3/min], μ is the fluid viscosity [cP], L is the core length [in], Δp is the pressure drop across the core [psi], and D is the core diameter [in].

Coreflood experiments comparing static treatments (soaking) with dynamic treatments (flow) were executed using a 20 wt % GLDA solution. During the static treatments the injection valve was closed for a certain amount of time (1-6 hr) after dosing 1 PV of GLDA solution, without releasing the pressure. After the soaking time the GLDA solution was washed from the core with water. In some cases this treatment was repeated several times with a fresh dose of GLDA solution. The dynamic treatment was performed with an injection rate of 1 ml/min.

Experiment 1: Dynamic Treatment

A dynamic coreflood experiment was done with the dolomite core in which in total 14 PV of GLDA solution was dosed in nearly 7 hours. After the treatment, face dissolution and loss of the rock strength were observed at the inlet side of the core as a result of the high pressure and temperature and the long contact time needed due to the slow dissolution rate of dolomite. Face dissolution is unwanted, as it consumes the treatment solution without improving the permeability and can cause operational problems for future treatments.

Experiments 2-6: Static Treatments

Table 1 shows the result of the static treatments and compares treatments with 1 continuous soaking period (Experiments 2-4) and experiments with various subsequent soaking treatments divided by a wash (Experiments 5-6). In contrast to the dynamic treatment, face dissolution was negligible for all static treatments. Comparing the values obtained for every type of test it is possible to observe a different tendency. While the continuous soaking time has a clear tendency to achieve a maximum increase in permeability of around 35%, the repeated soak-wash treatments show a linear increase, since with every injection fresh GLDA will react with the dolomite. In particular, the repeated soak-wash treatments indicate that cores consisting of material with a low dissolution rate in the treatment solution can be successfully stimulated, without the need for high pressures or long injection times, reducing the risk of face dissolution.

TABLE 1

Coreflood experiments on dolomite cores with continuous soaking and repeated soak-wash treatments

| Experiment | Soaking Time | Initial Permeability $K_i$ (mD) | Final Permeability $K_f$ (mD) | $K_f/K_i$ (% of increase) |
|---|---|---|---|---|
| 2 | 1 Hour | 24.56 | 28.07 | 14.29 |
| 3 | 3 Hours | 24.56 | 32.75 | 33.33 |
| 4 | 6 Hours | 26.20 | 35.73 | 36.33 |
| 5 | 2 × 1 Hour | 26.20 | 32.75 | 25.00 |
| 6 | 3 × 1 Hour | 24.56 | 35.73 | 45.45 |

The invention claimed is:

1. Process to treat a subterranean formation by introducing a composition containing between 1 and 40 wt % on total weight of the composition of a chelating agent selected from the group of glutamic acid N,N-diacetic acid or a salt thereof (GLDA), aspartic acid N,N-diacetic acid or a salt thereof (ASDA), and methylglycine N,N-diacetic acid or a salt thereof (MGDA) into the formation at an original flow rate in an original direction, wherein the process comprises a soaking step wherein the flow rate of the composition is purposively decreased from the original flow rate for a period of time, and then increased, said increased flow being in either the original direction or a different direction.

2. Process of claim 1, wherein the temperature during the process is between 77 and 400° F. (about 25 and 204° C.).

3. Process of claim 1, wherein the formation is a carbonate formation, a sandstone formation, an illitic formation, or a shale formation having a dissolution rate in the composition of less than $5 \cdot 10^{-6}$ gmole/cm$^2$·s at 121° C.

4. Process of claim 1, wherein the formation is a carbonate formation, a sandstone formation, an illitic formation, or a shale formation having an initial permeability of less than 10 mD.

5. Process of claim 1, containing more than one soaking step.

6. Process of claim 1, wherein the composition in addition contains a further additive from the group of foam extenders, crosslinking agents, anti-sludge agents, surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, viscosity stabilizers, rheology modifiers, gelling agents, scale inhibitors, breakers, salts, brines, pH control additives, bactericides/biocides, particulates, crosslinkers, relative permeability modifiers, sulfide scavengers, fibres, nanoparticles, and consolidating agents.

7. Process of claim 1, wherein the pH of the composition is between 2 and 5.

8. Process of claim 1 that is a matrix-acidizing process or an acid-fracturing process.

9. Process of claim 8, wherein at the same time the wellbore is cleaned or descaling of equipment used in the process or descaling of the wellbore takes place.

* * * * *